United States Patent [19]
Dobson et al.

[11] 3,824,661
[45] July 23, 1974

[54] PROCESS FOR THE FABRICATION OF STRUCTURAL COLUMN MEMBERS

[75] Inventors: Richard N. Dobson, Village of Creemore, Ontario; Gordon A. Webster, Town of Dundas, Ontario, both of Canada

[73] Assignee: Dominion Foundries & Steel Limited, Hamilton, Ontario, Canada

[22] Filed: Jan. 29, 1973

[21] Appl. No.: 327,347

Related U.S. Application Data

[62] Division of Ser. No. 220,297, Jan. 24, 1972.

[52] U.S. Cl.............................................. 29/155 C
[51] Int. Cl............................................ B23p 17/00
[58] Field of Search .. 29/155 C, 155 R, 429, 200 P, 29/200 J, 200 R

[56] References Cited
UNITED STATES PATENTS
3,335,704  8/1967  Freebourn...................... 29/200 P X
3,711,919  1/1973  Cousin.............................. 29/200 P Primary Examiner—Thomas H. Eager
Attorney, Agent, or Firm—Stanley J. Rogers

[57] ABSTRACT

In a process for the production of a structural column member of solid cross-section the member is rolled directly from a steel billet; the billet is mounted in suitable apparatus (an example of which is described in the specification) establishing a theoretical axis along the column and its ends are squared relative to this axis. One end is provided with two accurately-located pins which are a close fit in corresponding accurately-located holes in the adjacent end of an abutting member. The aligned pin and hole in the opposite ends of each member establish the said theoretical axis which is used for locating brackets etc. fastened to the column member, despite any deviations of the member from straight. This theoretical axis is also used in assembling the members in a structure incorporating them.

5 Claims, 7 Drawing Figures

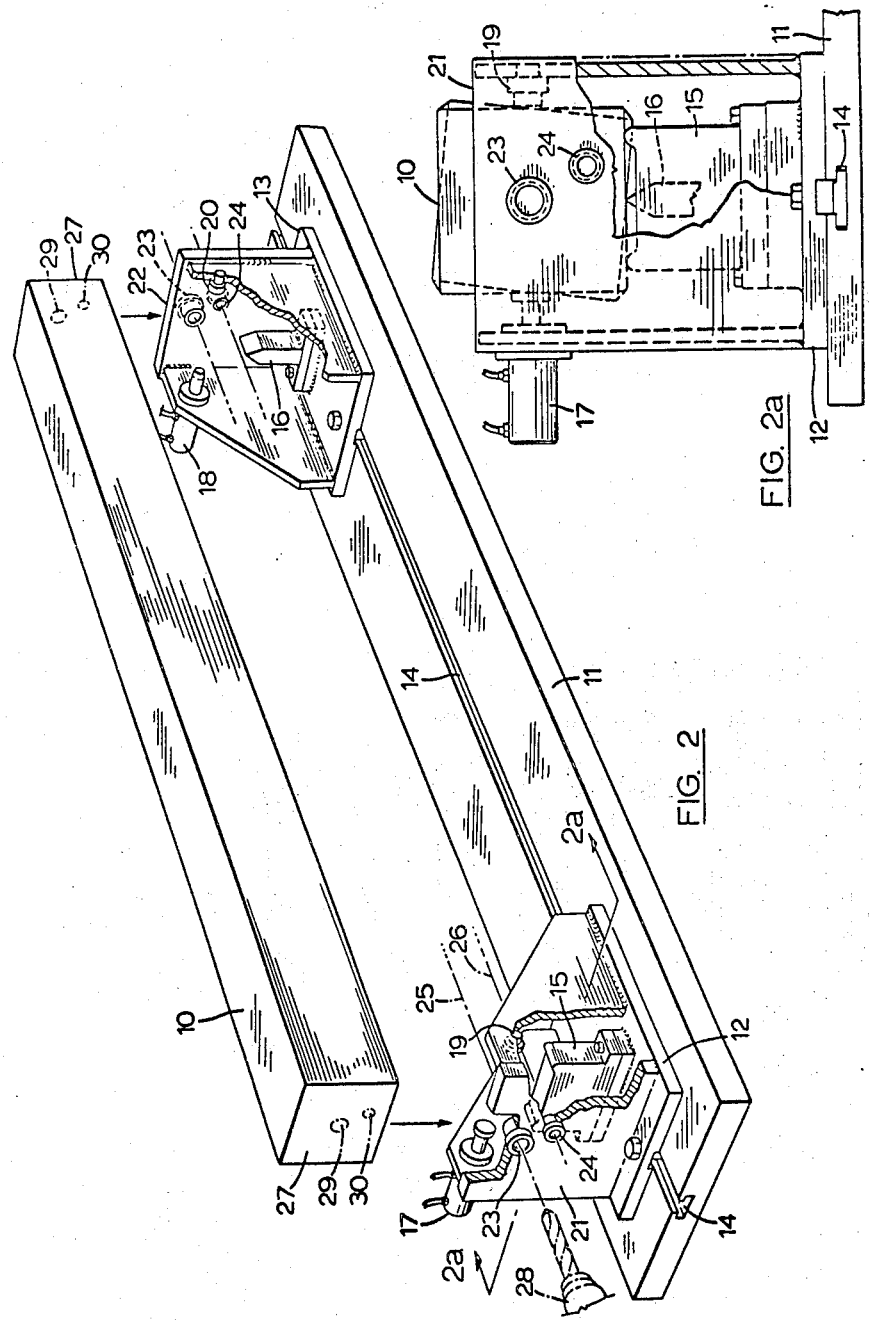

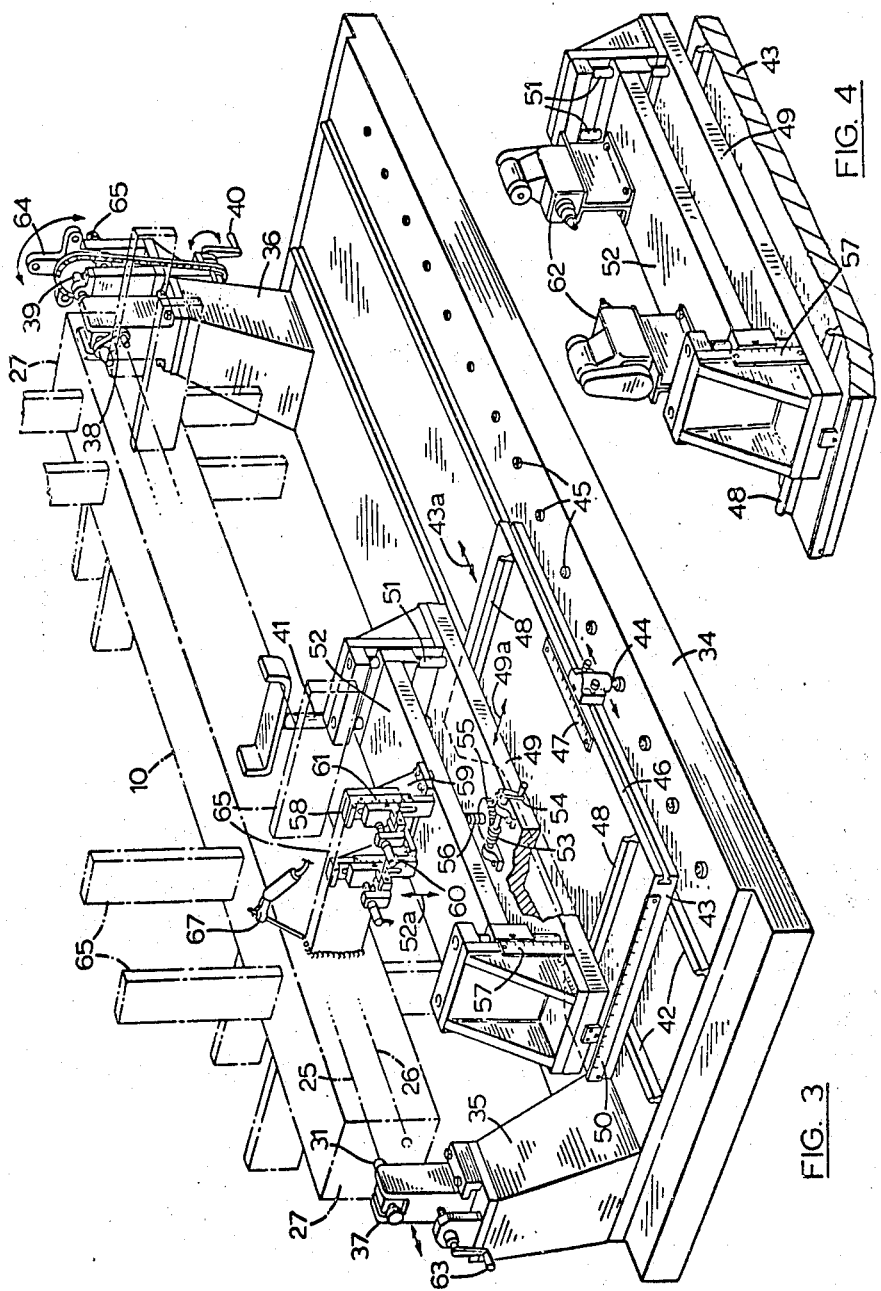

3,824,661

PROCESS FOR THE FABRICATION OF STRUCTURAL COLUMN MEMBERS

CROSS REFERENCE TO RELATED APPLICATIONS

The present application is a division of our application Ser. No. 220,297 filed Jan. 24th 1972.

FIELD OF THE INVENTION

The present invention is concerned with a process for fabrication of structural column members.

DESCRIPTION OF THE PRIOR ART

The design and erection of steel structures, for example, for high-rise buildings employing straight column members subjected to high axial compression forces, has hitherto usually involved the design and fabrication of special rolled or custom built-up column sections, with the purpose of minimizing the weight of the structure. It has now been discovered that the use of columns comprising solid square or rectangular rolled-steel sections has distinct advantages of cost and ease of production. For example, such solid sections can be produced economically in a wide range of sizes in the slabbing mill of a steel plant, without requiring the use of expensive special shaping rolls and expensive aligning feed mechanisms.

DEFINITION OF THE INVENTION

It is the object of the present invention to provide a new process for the production of solid-section column members whereby their installation into a structure is facilitated.

In accordance with the present invention there is provided a new process for the production of a structural column member constituted by an elongated steel billet of solid cross section, the process including the steps of establishing longitudinally of the member straight spaced parallel first and second axes, rendering the end faces of the member perpendicular to the said axes, providing in each end face a first pin-receiving hole coaxial with the said first axis and a second pin-receiving hole coaxial with the second axis, providing in one end face protruding therefrom a first pin coaxial with the first axis for close fit engagement in the corresponding first hole of an abutting member, and providing in one face protruding therefrom a second pin for close fit engagement in the corresponding second hole of an abutting member.

In the application of the present invention it has been found that the geometry of the cross-section of the resultant structural member, which preferably is square or rectangular, together with the method of machining employed, permits more accurate workmanship than normally is possible in a fabricating shop using the above-mentioned built-up column. For example, it would be no more expensive to produce column members of the invention with holes centered to ±0.025 cm in accuracy, than to provide built-up columns in the field with holes centered at ±0.15mm in accuracy, as with the current trade practices.

The new product of the process of this invention comprises a solid structural column member having special properties which permit quick and accurate fabrication and subsequent assembly. This is accomplished primarily by means of two straight, parallel, longitudinal axes established within the column member by two uniquely positioned and carefully drilled holes at each end of the member with the use of two close-fitting pins engaging in two of these holes in one end. These end holes thereafter provide reference locations for positioning attachments which are fastened to the column surfaces during shop fabrication, and later the holes cooperate with close-fitting pins for locating the column member in the building structure in order to provide, both in theory and practice, the greatest accuracy and rapidity of assembly of one column member on top of another. The tolerances for location and clearance between each pin and the corresponding hole preferably is about ±0.012cm to be effective. The close fit of the pins in the holes, together with their careful location at the ends of the column, provide the sole means for accurate mechanical assembly, without recourse to visual or other rough methods of alignment currently used.

A first apparatus used in the process of the invention mounts the column member by means of two points or edges supporting one end of the column and one point or edge supporting the opposite end, and by means clamping each end of the column without distorting any natural bow or twist of the column. A drill jig fixture is used for drilling coaxial holes at the two ends of the column member, the axes of the coaxial holes constituting a predetermined straight centre line for the column member, despite the said bow or twist therein, and a second line exactly parallel to the central line.

Another apparatus used in the process of the invention enables accurate rotational positioning of the column member about its central axis by use of predetermined locking stops in rotational supports at the column member ends. In this way the said two reference holes at each end of the column member are used for accurately positioning the column during shop assembly of attachments thereto and, as described hereinafter, for accurate and rapid assembly of a structure from the column members in the field, both operations being of equal importance in achieving dimensional accuracy of the final building assembly.

DESCRIPTION OF THE DRAWINGS

Particular preferred embodiments of the invention will now be described, by way of example, with reference to the accompanying diagrammatic drawings, wherein:

FIG. 2 is a general perspective view of an apparatus employed in the initial stages of the fabrication of a column member of FIG. 1, FIG. 2a is a section taken on the line 2a — 2a of FIG. 2, FIG. 3 is a general perspective view of another apparatus employed in stages subsequent to those for which the apparatus of FIG. 2 is employed, FIG. 4 shows a portion of the apparatus of FIG. 3 showing different auxiliary units that may be used therewith.

DESCRIPTION OF THE PREFERRED EMBODIMENTS

Figure 1:
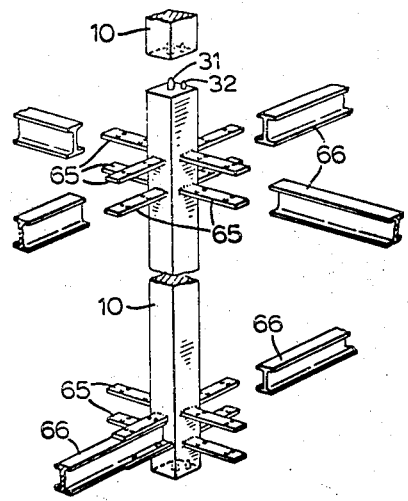
FIG. 1 is a perspective view of a new structural column member produced by a process in accordance with the invention ready for installation in a corresponding metal structure.

The structural column member 10 illustrated by the drawings is of square cross-section, but can also be of rectangular cross-section, and is formed by continuous casting or by hot rolling directly from a steel billet in the slabbing mill of a foundry. As an example only, such a member may have a length of about 4 to 10 metres, while its cross-sectional area normally will measure from about 400 to 4,000 sq. cm, the maximum dimensions depending of course upon the capacity of the mill. Under present day mill practice it is acceptable that such a rolled member will deviate not more than 1 mm per mm of length from straight. In addition the member may be twisted along its longitudinal axis by an angle of up to about 3°.

In a first stage of the process for the production of the completed member 10 the column member is placed in the apparatus of FIGS. 2 and 2a comprising a rigid, accurate flat planar base 11, on which two end fixtures 12 and 13 are mounted by an accurate longitudinal slot 14 for movement toward and away from one another in order to accommodate members of different lengths. One end fixture 12 is provided with a support member 15 providing two spaced longitudinal ridges (alternatively two spaced points may be used) on which the adjacent end portion of the column side face rests accurately parallel to the face of the base 11 and the slot 14. The other fixture 13 has a support member 16 providing only a single longitudinal edge (or point), so that the adjacent end portion of the column side face will rest thereon, despite the presence of a twist in the column, as illustrated by FIG. 2a. The ends of the column are held firmly transversely in the fixtures by respective hydraulic motors 17 and 18, which press the column ends against respective stops 19 and 20.

End walls 21 and 22 of the fixtures 12 and 13 constitute drilling jigs, each carrying drill guides 23 and 24. The two guides 23 are disposed very accurately coaxial with one another about a first common straight longitudinal axis 25 parallel to the longitudinal axis of the slot 14, while the two guides 24 are accurately coaxial with a second common straight longitudinal axis 26, all these axes being parallel to one another. two end walls 21 and 22 are shown as integral with their respective fixtures, but usually they will be removable, or otherwise adjustable, so that the positions and sizes of the drilling guides can be changed for use with different hole requirements of different members. With the column firmly clamped in the fixtures the column end faces 27 are formed accurately flat and parallel to one another to the degree of accuracy common in the industry, or, in the event that these faces have already been so formed, then their flatness and parallelism can again be checked and any necessary corrections made by use of a suitable tool. At the present time the requirement for flatness and parallelism is that when erected and under load any spacing between abutting end faces shall not be greater than 0.010 mm over 80 percent of the abutting bearing surfaces. Thereafter, a drill unit, such as the unit 28 shown in broken lines in FIG. 2, is used in conjunction with the guides to drill a first central end hole 29 and a second side end hole 30 in each end of the column. Pins 31 and 32 are then pressed into the respective holes of one column end, these pins being close fits in the respective holes 29 and 30, preferably their diameter is from ± 0.01 cm to ± 0.03 cm from the diameter of the corresponding hole.

Figure 5:
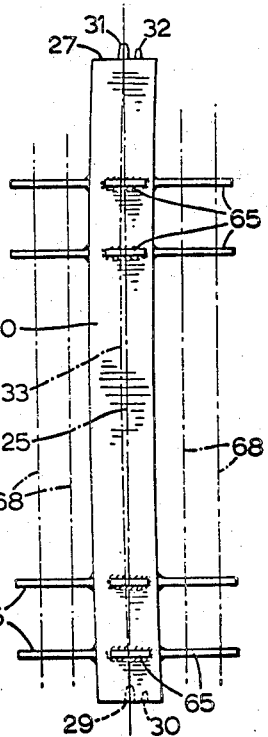
FIG. 5 is a side elevation of a column member and illustrates the operation of the invention.
Figure 6:
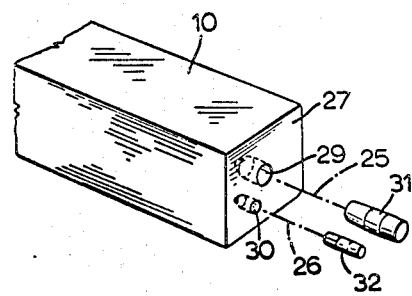
FIG. 6 is a perspective view to an enlarged scale of one end of the column member to illustrate a detail.

Since the two holes 29 were formed accurately coaxial, the first common longitudinal axis 25 of the remaining central hole and the pin 30 will constitute a theoretical central longitudinal axis of the column even though, owing to bends and twists in the column, this usually will not coincide with the actual longitudinal axis, indicated for example in FIG. 5 by the reference 33. Similarly, the second common axis 26 of the remaining side hole 30 and the corresponding pin 32 is accurately parallel to the theoretical common axis 25.

The column is now at a stage in its fabrication for another step of the process to be applicable, using the apparatus of FIGS. 3 and 4. An accurate flat bed 34 carries two standards 35 and 36 which are employed to support the column for rotation about the longitudinal datum axis 25. Thus, the pin 31 engages in an axially movable carriage 37 on the standard 35, while the holes at the other end are engaged by respective pins on an arm 38 rotatably mounted on the standard 36. The arm is mounted on a shaft 39 which is in turn mounted by bearings for rotation about the axis 25, the rotation being produced by a mechanism illustrated diagrammatically and comprising a handle 40 driving via a connecting chain gear. A hydraulically operated adjustable-height strut 41 engages the column approximately at its midpoint to relieve the weight of the column and remove the downward deflection thereof.

The bed 34 also carries two tracks 42 which are parallel to one another in both the horizontal and vertical planes, and are also parallel to the axis 25. A carriage 43 moves on these tracks in the direction of the arrows 43a, the position of this carriage longitudinally of the bed being set coaxially by means of a pin 44 which can be selectively engaged in a plurality of bores 45 accurately spaced equidistantly along the length of the bed. Fine adjustment of the carriage position is obtained by relative movement between the pin 44 and the carriage, the pin moving in an accurate edge slot 46 to at least the extent of an indicating scale 47. The carriage 43 also carries spaced transversely-extending parallel tracks 48 on which moves another carriage 49 in the direction of the arrows 49a, the position thereof radially relative to the axis 25 being indicated by a scale 50 and co-operating pointer. The carriage 49 in turn carries four spaced parallel guide members 51 extending perpendicular to the plane of the carriage and of the bed 34, the members supporting a carriage 52 for corresponding movement in the direction of the arrows 52a, under the action of a mechanism illustrated diagrammatically as comprising a worm gear 53 rotatable by a handle 54 and rotating a pinion 55 that rotates a threaded drive shaft 56. The vertical position of the carriage is indicated by scale 57 and pointer.

As illustrated in FIG. 3 the apparatus includes two radially spaced jigs 58 for supporting respective connection brackets, the jigs being fastened to the carriage 52, each jig comprising a vertical standard 59 carrying a vertically-adjustable hydraulically-operated clamp member 60; a scale 61 is used to indicate the vertical position of the clamp member. As illustrated in FIG. 4 the carriage 52 supports two oppositely disposed drilling heads 62 whose function will be explained below. It will be understood by those skilled in the art that the jigs 58 and the drill heads 62 may be interchangeable on a single carriage, or they may be fixtures to their respective carriages 52, the entire assembly from the carriage 48 on, or from the carriage 42 on, being duplicated and interchanged as required.

In operation of the apparatus of FIGS. 3 and 4, and completion of the process of the invention, the column member is mounted in the apparatus with its centre pin engaged in the carriage 37, and then is moved to the right as seen in FIG. 3, by a mechanism illustrated diagrammatically as comprising a handle 63 rotating a screw-threaded rod, until the centre hole 29 at the other end is engaged by the corresponding pin on the arm 38. At this time the arm is free to rotate relative to the remainder of its associated mechanism, so that it can be turned to engage the other pin thereon with the other hole 30 in the end of the column, while a cross-shaped member 64 is held stationary by a pin 65 on the standard 36, the pin being selectively engageable with co-operating holes at the ends of the four arms of the member 64. With the second pin engaged in the hole 30 the arm 38 and the member 64 are connected for movement together, and the column can now be turned about its axis 25 to any one of four positions pre-set by the arms of the member 64 accurately at right angles to one another, and can be returned to any one of the four positions as required.

In the embodiment particularly illustrated it is desired to attach to each end of the column fixtures comprising four pairs of connection brackets 65, one pair to each of the four faces, with the connection brackets drilled to permit the fastening thereto of corresponding H-beams 66 that support the floors of the structure in which the column is incorporated. To this end each bracket 65 is in turn mounted in the two clamp members and then is brought by adjustment of the carriages into abutment with the corresponding face of the column member, but with its actual position determined solely by its relation to the axis 25 as set by the apparatus, and not by any relation between the bracket and the outside face contacted thereby, or by the actual longitudinal centre line of the column; the bracket is then welded securely in place, for example by use of a welding torch illustrated at 67. It will be seen therefore that all of the brackets can be fastened accurately spaced and accurately parallel relative to each other, within the limits of the apparatus, despite relatively severe distortions in shape of the column, by their common relation to the accurately-established common axis 25.

With all the brackets fastened in place the clamp members are replaced by the drilling heads 61 and the holes required for fastening the beams 66 thereto are drilled along axes 68 (FIG. 5) that are accurately parallel to one another and to the axis 25. The completed columns are thereafter transported to the side and erected by lowering them one on top of the other with the two pins of each lower column engaged in the holes of the column above. The centre pin is substantially longer than the side pin, so that it will enter its corresponding hole first; the column is then rotated on this pin, if necessary, until the rotational positioning side pin and hole register with one another, when the columns are brought completely together. Despite the number of columns piled one on top of the other, despite differences in the straightness etc. of the individual column member, and despite differences in the cross-sectional area of the members, the resulting column establishes a common vertical axis 25 to which all fixtures to the column members are accurately related, so that other parts of the structure fastened to these fixtures will also be automatically accurately related to this axis. In some embodiments neither of the axes 25 and 26 may be a centrally-located axis of the column member, but nevertheless either will serve as the datum axis for accurate location of the theoretical centre line and for the location etc. of the fixture.

The use of at least one pin, usually the central pin, of relatively large diameter closely fitted in a corresponding hole has an added advantage that it can of itself in some circumstances constitute all of the shear-resisting connection that is required between abutting column members, obviating the need for additional side straps and brackets, etc. The ends of the pins protruding from the member preferably are tapered to facilitate their insertion in the respective holes; the hole entrances are bevelled for the same reason, such bevelling avoiding the possibility of metal being scraped from the side of the pins which might then become wedged between abutting columns and prevent proper seating therebetween.

We claim:

1. A process for the production of a structural column member constituted by an elongated steel billet of solid cross section, the process including the steps of establishing longitudinally of the member straight spaced parallel first and second axes, rendering the end faces of the members perpendicular to the said axes, providing in each end face a first pin-receiving hole coaxial with the said first axis and a second pin-receiving hole coaxial with the second axis, providing in one end face protruding therefrom a first pin coaxial with the first axis for close fit engagement in the corresponding first hole of an abutting member, and providing in one face protruding therefrom a second pin for close fit engagement in the corresponding second hole of an abutting member.

2. The invention as claimed in claim 1, and including the step of fastening to a surface of the column member at least one fixture in a position determined by the relation of the said position to one of said axes constituting a datum axis.

3. The invention as claimed in claim 1, wherein the said first axis is centrally disposed and constitutes a datum axis and including the step of fastening to a surface of the column member at least one fixture in a position determined by the relation of the said position to the said centrally disposed axis.

4. The invention as claimed in claim 2, and including the step of performing on the said at least one fixture a drilling operation on an axis parallel to the said datum axis at a predetermined distance therefrom.

5. The invention as claimed in claim 3, and including the step of performing on the said at least one fixture a drilling operation on an axis parallel to the said centrally disposed datum axis at a predetermined distance therefrom.

* * * * *